United States Patent
Rumph

(10) Patent No.: US 6,327,840 B1
(45) Date of Patent: Dec. 11, 2001

(54) TOOTHBAR AND TOOTHBAR CENTER SUPPORT ARRANGEMENT FOR BALER PICKUP REEL

(75) Inventor: George William Rumph, Bloomfield, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/072,646

(22) Filed: May 5, 1998

(51) Int. Cl.⁷ .................................................. A01D 39/00
(52) U.S. Cl. .............................................. 56/341; 56/346
(58) Field of Search ........................... 56/341, 364, 14.4, 56/16.4, 220; 100/88

(56) References Cited

U.S. PATENT DOCUMENTS

| | | | |
|---|---|---|---|
| 1,725,745 | * 8/1929 | Bauer | 56/364 |
| 1,877,519 | 9/1932 | MacGregor . | |
| 1,939,385 | * 12/1933 | Burr | 56/14.4 |
| 3,478,500 | * 11/1969 | Rhoads | 56/14.4 |
| 3,724,183 | 4/1973 | Hurlburt | 56/220 |
| 3,851,450 | * 12/1974 | Nelson | 56/14.4 |
| 4,068,454 | 1/1978 | Webb | 56/220 |
| 4,187,666 | * 2/1980 | McIlwain | 56/341 |
| 4,604,859 | * 8/1986 | Sasaki et al. | 56/341 |
| 4,928,462 | * 5/1990 | Lippens et al. | 56/341 |
| 5,394,682 | 3/1995 | Frimml et al. . | |

OTHER PUBLICATIONS

John Deere Parts Catalog No. PC–1915 for Models 430 and 530 Round Balers dated, Nov. 19,1982 (Cover page and page 47).
John Deere Parts Catalog No. PC 2562 for Model 100 Sqare Baler, dated Feb. 1997. (Cover page and page 48).

* cited by examiner

Primary Examiner—Thomas B. Will
Assistant Examiner—Meredith C. Petravick

(57) ABSTRACT

A baler pick-up reel includes a reel shaft to which is fixed a center toothbar support. A first set of toothbars are located to one side of the center toothbar support and respectively have stub shafts at first ends which are respectively received in a first set of equi-angularly spaced bosses forming part of the toothbar support and projecting in a direction opposite to the first set of toothbars. Similarly, a second set of toothbars are located on an opposite side of the center toothbar support and respectively include stub shafts at first ends that are respectively received in a second set of equi-angularly spaced bosses forming part of the toothbar support and projecting in a direction opposite to the second set of toothbars. A plurality of teeth are mounted to each toothbar and have tines which are evenly spaced across the working width of the reel.

1 Claim, 1 Drawing Sheet

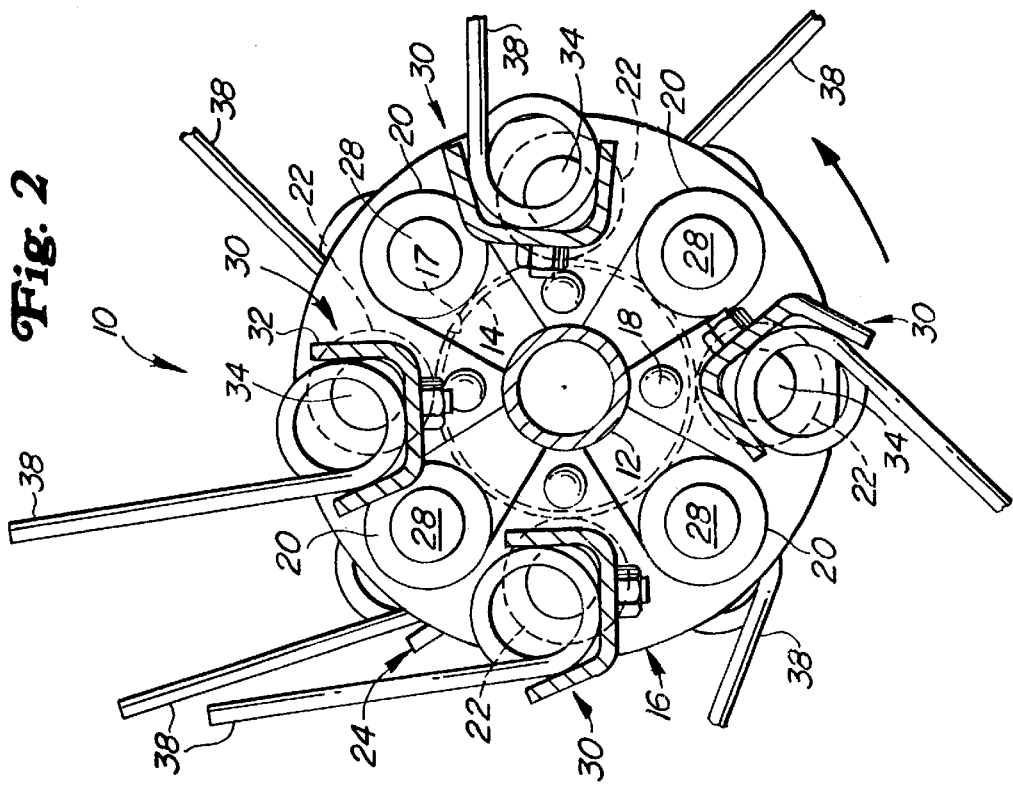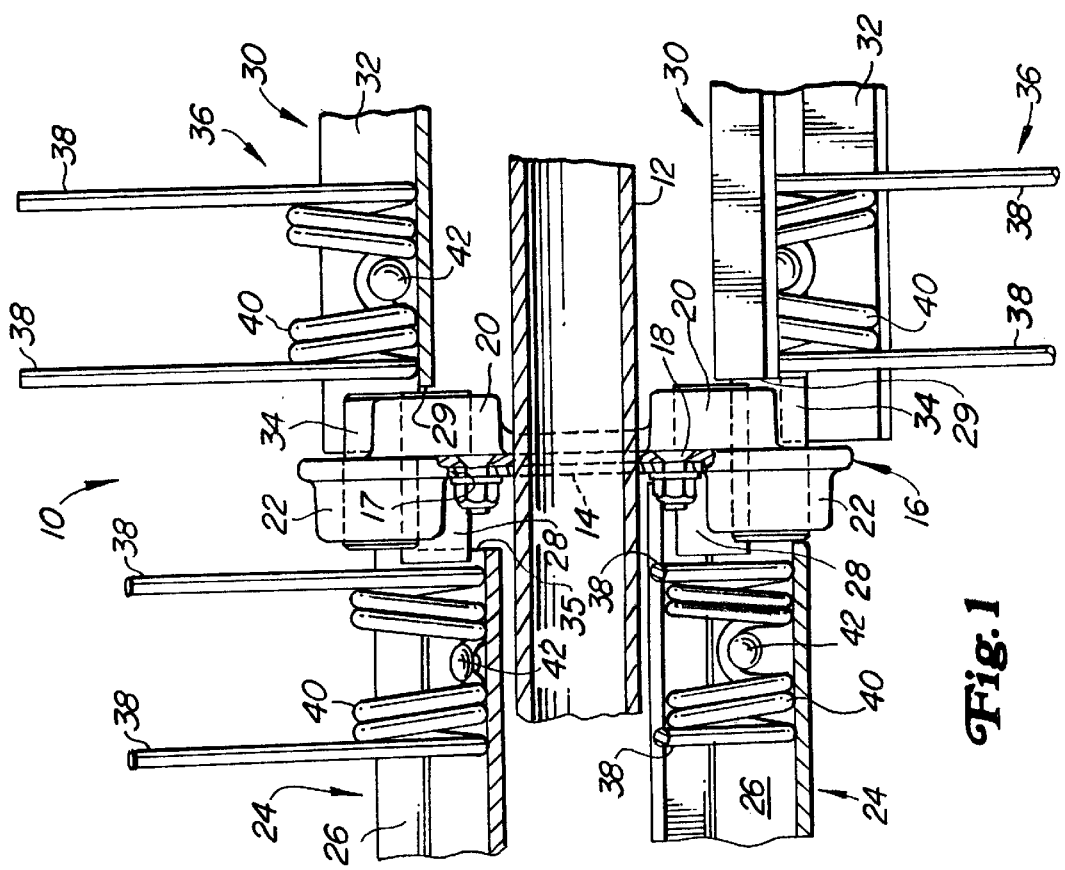

US 6,327,840 B1

TOOTHBAR AND TOOTHBAR CENTER SUPPORT ARRANGEMENT FOR BALER PICKUP REEL

BACKGROUND OF THE INVENTION

The present invention relates to crop pick-ups and more specifically relates to toothbar supports for the reels of baler pick-ups.

Agricultural balers for forming either rectangular or round bales are equipped with a pick-up for conveying windrowed crop towards the baling chamber of the baler. It is common practice to construct these baler pick-ups with a reel having a central support shaft that extends the full working width of the pick-up and has toothbar support spiders or discs fixed to its opposite ends for supporting a plurality of equi-angularly spaced toothbars that extend between and have their opposite ends respectively mounted in the support spiders or discs. U.S. Pat. No. 5,394,682 issued to Frimml et.al on Mar. 7, 1995 discloses a typical pick-up reel.

Balers for making large round or rectangular bales have the capacity to process a large amount of windrowed crop. These windrows are preferably formed as wide as possible so that, in the case of hay crops, the crop can better cure in the windrow, and, in the case of large round balers, may be fed more evenly across the width of the bale so as to form uniform shaped bales. In order to gather the crop from wide windrows, it is the practice to use a pick-up which is wider than the bale being formed. This requires the pick-up reel to have toothbars which are of such a length that they are subject to being deformed during operation as when the baler passes over obstructions or clumps of crop that impose forces on the center of the reel. While such deformation can be somewhat lessened by supporting the toothbars at the middle of their length, such center supports have not been entirely satisfactory due to the fact that they present an obstacle to the mounting of the reel teeth to the center sections of the toothbars which results in a gap between tines of adjacent teeth on opposite sides of the center support which is larger than that desired for consistent good feeding of crop.

SUMMARY OF THE INVENTION

According to the present invention there is provided a crop pick-up reel having an improved center support for the toothbars.

An object of the invention is to provide a crop pick-up having a reel with a center support and toothbar arrangement which results in even spacing of the tines of the teeth carried by the toothbars.

A more specific object of the invention is to provide a center support and toothbar arrangement, as set forth in the preceding object, wherein the opposite sides of the center support is designed for supporting the inner ends of short toothbars that extend only halfway across the working width of the pick-up, the mountings afforded by the support resulting in the toothbars on one side of the support being angularly offset relative to the toothbars on the other side of the support.

These and other objects of the invention will become apparent from a reading of the ensuing description together with the appended drawings.

BRIEF DESCRIPTION OF THE DRAWINGS

FIG. 1 is a front elevational view of a portion of a crop pick-up reel, with the toothbar support mounting area being shown in section, showing the toothbars of the reel supported in accordance with the present invention.

FIG. 2 is a right end view of the pick-up reel shown in FIG. 1.

DESCRIPTION OF THE INVENTION EMBODIMENT

The drawings show a part of a crop pick-up reel 10 including a tubular center support shaft 12 having a circular flange 14 formed of a circular plate having a concentric center hole and being welded to the shaft 12, at a central location between opposite ends of the shaft. The flange 14 is provided with four equi-angularly spaced mounting holes. A circular center toothbar support 16, formed as a circular casting having a concentric center hole surrounded by an annular recess 17 receiving the flange 14, is provided with four mounting holes respectively arranged in axial alignment with the holes in the flange 14 and is fixed to the flange with plow bolts 18 received in the aligned holes and having heads located in recesses provided in the toothbar support 16, the purpose of providing the recess 17 and using the plow bolts 18 with bolt head recesses being explained below.

Provided at equi-angularly spaced locations on opposite sides of the toothbar support 16, as viewed in FIG. 1, are right- and left-hand sets of four cylindrical mounting bosses 20 and 22, respectively, with the sets being angularly offset 45° from each other. Mounted to each right-hand boss 20 is a toothbar 24, located on the left-hand side of the support 16, in the form of a channel member 26 having stub shafts 28 fixed, as by welding or bolts (not shown), to its right-hand end and extending into the boss 20. The opposite end of the toothbar 24 is also defined by a stub shaft (not shown) but in this case the stub shaft has a crank arm fixed thereto and, for the purpose of assembly, is bolted to the toothbar, the crankarm carrying a cam follower in the form of a roller which is received in a cam track shaped for effecting a rocking motion of the toothbar, for a purpose explained below. So that the channel member 26 will clear the bosses 20 during such rocking motion, each channel is provided with a clearance notch 29 adjacent each stub shaft 28. Similarly, mounted to each left-hand boss 22 is a toothbar 30, that is identical in construction to the toothbar 24, and includes a channel member 32 having a stub shaft 34 welded or bolted to its left-hand end and received in a respective one of the left-hand bosses 22. A clearance notch 35 is provided in the end of each channel member 32 adjacent the stub shaft 34. The support 16 is heat treated such that it has a good wear characteristic despite the fact that a metal-to-metal, sliding contact exists between the toothbars and the bosses 20 and 22 of the support.

Mounted to each toothbar 24 and 26 at evenly spaced locations along their lengths are a plurality of spring tooth assemblies 36. Each tooth assembly 36 is of a known construction comprising double tines 38 joined by a double coil spring section 32 having a central loop engaged by a mounting bolt 42. It is noted that the spacing between the plane containing the tines 38 closest to the right-hand side of the support 16, and the plane containing the tines 38 closest to the left-hand side of the support 16 is the same as the spacing between the tines 38 of a given spring tooth assembly 36. In other words, the tines 38 are spaced evenly across the working width of the reel 10 with no dead space occurring at the support 16. Thus, by making each of the toothbars 24 and 30 of a length for spanning only half the width of the reel 10 and offsetting the mounting of the toothbars 24 and 30 one to another so that their respective stub shafts 28 and 34 overlap, it is possible to provide a consistent, desired spacing between the tines 38 across the middle of the reel, whereby a reliable delivery of windrowed crop is achieved.

While the present embodiment is described as including but one other toothbar support 16 besides those at the ends of the reel shaft 12 and that this one support 16 is located in the middle of the shaft 12, it should be understood that, in installations where no cam is used and the toothbars are fixed so that the teeth remain radial throughout their movement, multiple supports 16 could be spaced across the length of the shaft with the toothbars then having lengths chosen for spanning the distance between adjacent supports and with the toothbars that extend between interior ones of the supports having stub shafts, like stub shafts 28 or 34, at their opposite ends.

The metal-to-metal fit between each toothbar and boss is such as to permit the toothbar to oscillate within the boss as is dictated by the aforementioned cam units (not shown) associated with the outer ends of the toothbars, this oscillation placing the tines 38 in the correct orientation for being cleanly withdrawn from the conveyed crop so as to leave it at the desired delivery point, in a manner well known in the art. By providing the annular recess 17 in the support 16 and using the plow bolts 18 with their heads recessed in the support 16, adequate clearance for permitting the oscillation of the toothbars 24 and 30 is ensured.

The operation of the reel 10 is thought to be understood from the foregoing description and for the sake of brevity is not repeated. Suffice it to say that the structure comprising the center support 16 and short toothbars 24 results, in comparison to a reel having a center support supporting toothbars which extend the full width of the reel, in a reel having greatly reduced torsional and bending loads on the reel shaft 12 and center support 16, and on the end supports and cam elements (not shown).

What is claimed is:

1. In a pick-up reel including a center reel shaft, a plurality of toothbars defined by first and second sets of toothbars arranged parallel to and spaced equi-angularly about said reel shaft such that the first set of toothbars are offset angularly from the second set of toothbars, a toothbar support fixed to said reel shaft at a location between opposite ends of said reel shaft and including first and second sets of cylindrical bosses respectively receiving shafts defining inner ends of said first and second sets of toothbars, with said first and second sets of toothbars respectively extending in opposite first and second directions from said toothbar support so that they extend completely across a zone defining a working width of said reel, and a plurality of tooth assemblies fixed along the length of each toothbar, the improvement comprising: said reel shaft having a circular flange fixed thereto; said toothbar support including a central plate-like body containing a circular recess receiving said circular flange; a plurality of releasable fasteners securing said flange to said body; and said first and second sets of bosses respectively projecting only in said second and first directions from said body.

* * * * *